George W. Hungerford
Machine for Cleaning & Separating Coffee Grain, Seed &c.
No. 119,149. Patented Sep. 19, 1871.

Witness:
Wm H Lotz
G. Lotz

Inventor
George W Hungerford.

George W. Hungerford
Machine for Cleaning & Separating Coffee
No. 119,149. Grain, Seed &c. Patented Sep. 19, 1871.

Witness:
Wm H. Lotz
G Lotz

Inventor
George W Hungerford

UNITED STATES PATENT OFFICE.

GEORGE WHITNEY HUNGERFORD, OF CHICAGO, ILLINOIS.

IMPROVEMENT IN MACHINES FOR CLEANING COFFEE, GRAIN, &c.

Specification forming part of Letters Patent No. 119,149, dated September 19, 1871.

*To all whom it may concern:*

Be it known that I, GEORGE WHITNEY HUNGERFORD, of Chicago, in the county of Cook and State of Illinois, have invented certain Improvements in Machines for Cleaning and Separating Coffee, of which the following is as pecification, reference being had to the accompanying drawing.

My invention consists in a machine of novel construction for cleaning coffee, and separating the large, the small, and the broken beans from each other.

Figure 1:
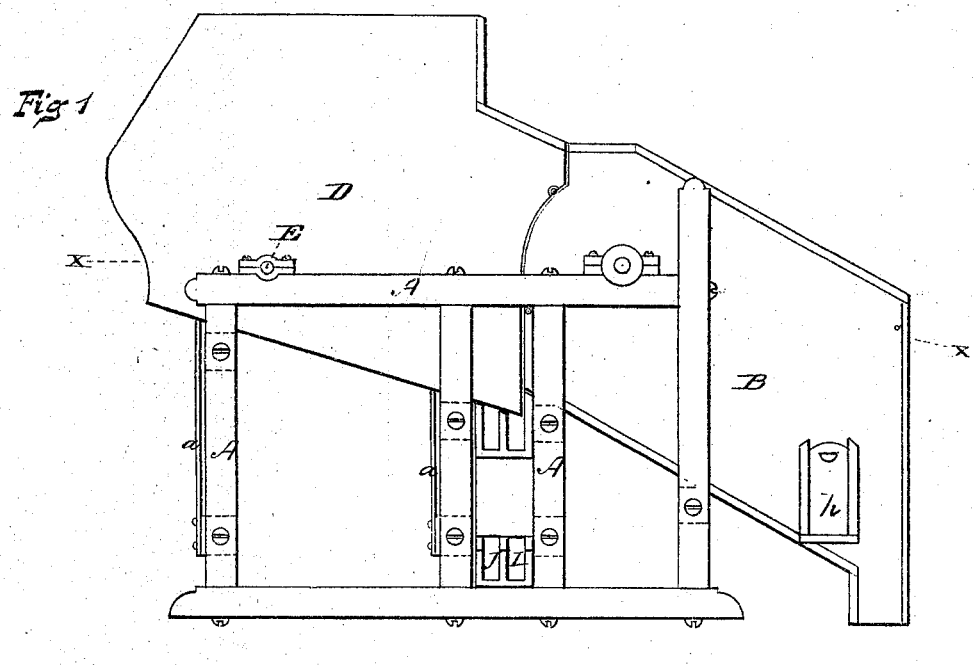
Figure 2:
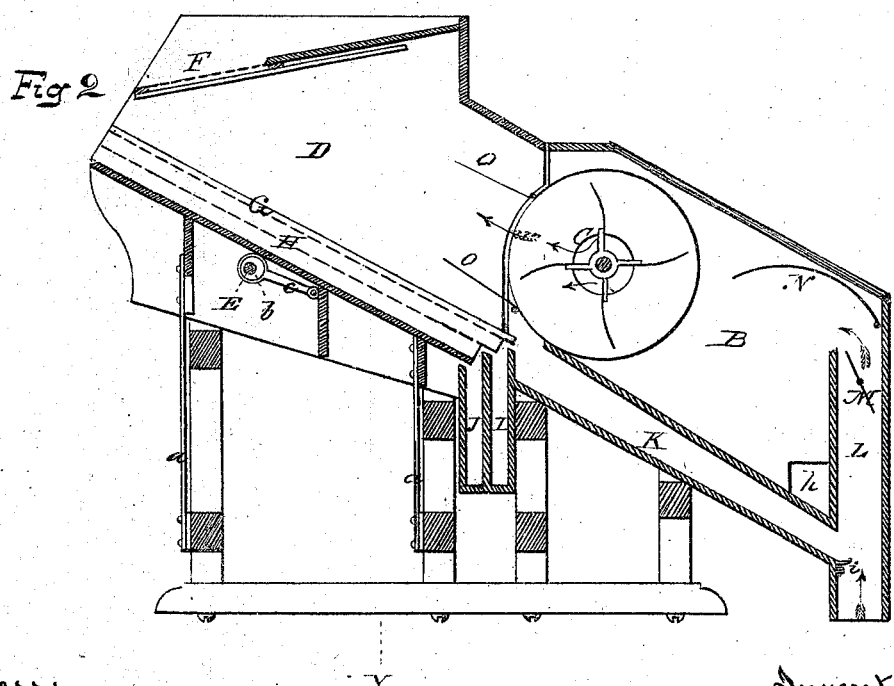
Figure 3:
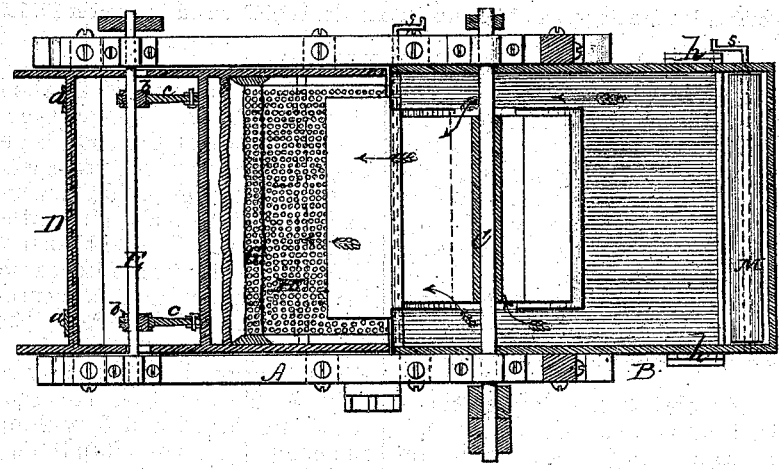
Figure 4:
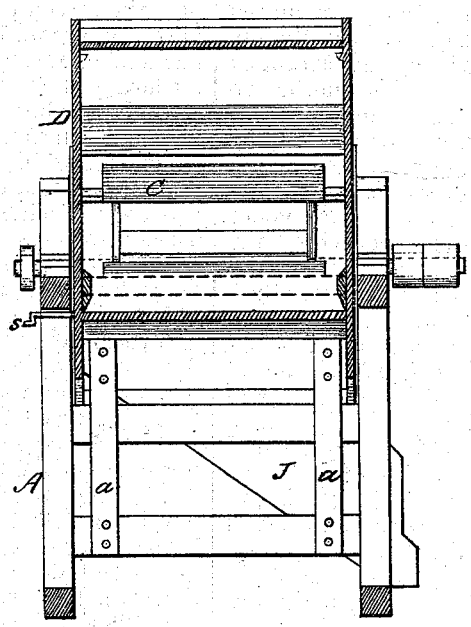

Figure 1 is a side elevation of my machine. Fig. 2 is a longitudinal vertical section through the middle of the same. Fig. 3 is a horizontal section of the machine on the line $x\ x$ of Fig. 1, and Fig. 4 is a transverse vertical section of the machine on the line $y\ y$ of Fig. 2.

A represents a strong frame, having an inclined body, B, of the form shown, mounted rigidly on it; and C is a fan mounted in the upper and open end of the body B, and arranged to draw air outward therefrom. D is another inclined body, open at both ends, mounted on four upright spring arms, $a$, with its lower end opposite the upper end of the body B. Under the body D is mounted a transverse shaft, E, provided with two eccentrics, $b$, which have yokes $c$ mounted upon them and connected to the body D, as shown in Figs. 2 and 3, so that as the shaft is turned the eccentrics give a slight longitudinal vibratory motion to the body D. In the top of body D is mounted a screen or sieve, F, inclined downward toward the outer end, and of such fineness as to permit the coffee to pass through while detaining all larger foreign particles. In the lower side of the body are secured two parallel screens, G and H, inclined in the opposite direction, the upper one, G, serving to retain the large beans, while it permits the small ones to pass through onto the lower screen H, which, in turn, retains the small beans and permits the broken ones to pass through. Under the lower end of body D are mounted two inclined troughs or chutes, I and J, the former to receive the small beans which roll off the lower end of screen H, and the latter to receive the broken beans which have fallen through said screen and rolled down on the bottom of the body. The top screen G extends beyond the other and discharges the large beans into the upper end of an inclined passage, K, in the rigid body B, as shown in Fig. 2. This passage K is located on the lower side of the body B and extends down to the lower end of the same, where it unites with a vertical passage or flue, L, which latter extends up inside of the body to near the top. The lower end of passage L is left open for the escape of the coffee discharged into it from passage K. A narrow ledge or lip, $i$, is secured in the passage L, along the lower edge of passage K, so that the descending coffee, striking thereon, will be thrown outward and slightly upward into passage L. The fan C is inclosed in a casing, as shown in Figs. 2 and 3, with openings through the ends of the same into the interior of body B, and an opening in the front at the end of body D. When the fan is operated, it draws a current of air up through passage L into the body B and forces it out, in a strong blast through body D, past the screens. In the passage L is pivoted a valve, M, by which the inlet of air is regulated; and above the upper end of the passage is hinged a concave shield or deflector, N, for directing the ascending column of air downward inside of the body B. In front of the fan are hinged two transverse wings or plates, O, which may be so adjusted as to direct the blast upward or downward, or to make it wide or narrow, as required. These wings, as also the valve M and shield N, are provided with cranks $s$ on the outside of the body, by which they are adjusted.

The machine being constructed and arranged as described operates as follows: The coffee is fed onto the screen F from above, and passes down through the same and falls upon the screen G. The screen F separates all the large impurities from the coffee and discharges them at its lower end, while all the smaller impurities, which fall through the screen with the coffee, are blown out by the blast through the end of the body. When the coffee falls on the screen G the large beans roll down thereon into the passage K, down which they pass into passage L, and thence out. The coffee in its descent strikes lip $i$ and is thrown outward and slightly upward, so as to receive the full force of the upward current of air, which carries up any light or decayed beans which may remain in the coffee and carries them over inside of the body, from whence they are removed through openings $h$, provided for the purpose. The small beans which pass through screen G onto screen H roll down on the latter into the trough I, which discharges them at one side of the machine. The broken beans pass through screen H and roll down on the bottom of the body into the trough J, which delivers them on one side of the machine also.

Having thus described my invention, what I claim is—

1. The herein-described machine for cleaning coffee, &c., consisting of the bodies or cases B and D having the passages L and K and spouts I and J, and fan C, all arranged to operate substantially as described.

2. The arrangement of the valve M, hinged deflector N, and the fan C with its adjustable deflecting-plates O O, all as herein described.

GEORGE WHITNEY HUNGERFORD.

Witnesses:
 WM. H. LOTZ,
 G. LOTZ.

(111.)